(12) United States Patent
Nguyen et al.

(10) Patent No.: US 9,670,762 B2
(45) Date of Patent: Jun. 6, 2017

(54) FRACTURING TIGHT SUBTERRANEAN FORMATIONS WITH A CEMENT COMPOSITION

(71) Applicant: HALLIBURTON ENERGY SERVICES, INC., Houston, TX (US)

(72) Inventors: Philip D. Nguyen, Houston, TX (US); Vladimir N. Martysevich, Houston, TX (US); Tim Stephens, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 69 days.

(21) Appl. No.: 14/627,984

(22) Filed: Feb. 20, 2015

(65) Prior Publication Data

US 2016/0245061 A1  Aug. 25, 2016

(51) Int. Cl.
  *E21B 43/26* (2006.01)
  *E21B 43/267* (2006.01)
  *C09K 8/66* (2006.01)

(52) U.S. Cl.
  CPC .............. *E21B 43/26* (2013.01); *C09K 8/665* (2013.01); *E21B 43/267* (2013.01)

(58) Field of Classification Search
  CPC .......... E21B 43/26; E21B 43/267; C09K 8/66
  USPC .................... 166/280.1, 308.1, 270
  See application file for complete search history.

(56) References Cited

U.S. PATENT DOCUMENTS

| | | | |
|---|---|---|---|
| 4,046,583 A | 9/1977 | Collepardi | |
| 4,385,935 A | 5/1983 | Skjeldal | |
| 4,797,159 A | 1/1989 | Spangle | |
| 7,044,224 B2 | 5/2006 | Nguyen | |
| 7,461,696 B2 | 12/2008 | Nguyen | |
| 2004/0112598 A1* | 6/2004 | Nguyen | C04B 28/02 166/276 |
| 2004/0261999 A1* | 12/2004 | Nguyen | C09K 8/665 166/292 |
| 2005/0098317 A1* | 5/2005 | Reddy | C04B 28/02 166/294 |
| 2005/0242455 A1 | 11/2005 | Toda et al. | |
| 2007/0007003 A1* | 1/2007 | Jackson | E21B 43/26 166/244.1 |
| 2007/0295500 A1* | 12/2007 | Chuprakov et al. | 166/249 |

(Continued)

OTHER PUBLICATIONS

"Effects of CementAdmixtures on the Physical Properties of Cement", available at http://petrowiki.org/File%3ADevol2397.png (last updated May 8, 2012) (lastaccessed Sep. 3, 2015).*

*Primary Examiner* — Silvana Runyan

(74) *Attorney, Agent, or Firm* — McGuireWoods LLP

(57) ABSTRACT

A method of fracturing a tight subterranean formation comprising: introducing a cement composition comprising cement and water into the tight subterranean formation thereby creating or enhancing a fracture in the tight subterranean formation, wherein the tight subterranean formation comprises at least one formation zone with a permeability of less than 1 millidarcy; allowing the cement composition to set within the fracture; and creating a permeable flow path within the set cement composition using pressure pulses. Another method comprises introducing a treatment fluid into the tight subterranean formation at or above the fracture gradient of the set cement composition to create or enhance a permeable flow path within the set cement composition.

22 Claims, 2 Drawing Sheets

(56) References Cited

U.S. PATENT DOCUMENTS

| | | | |
|---|---|---|---|
| 2009/0283017 A1* | 11/2009 | Spangle | C04B 28/04 106/672 |
| 2009/0308599 A1* | 12/2009 | Dusterhoft | E21B 28/00 166/249 |
| 2012/0018155 A1* | 1/2012 | Patil | C04B 28/04 166/293 |
| 2013/0206407 A1* | 8/2013 | Hofstaetter | C04B 26/02 166/280.1 |
| 2013/0341024 A1* | 12/2013 | Fonseca | E21B 43/261 166/281 |
| 2014/0144217 A1 | 5/2014 | Liu et al. | |
| 2016/0237341 A1* | 8/2016 | Bhamidipati | C09K 8/80 |

* cited by examiner

FRACTURING TIGHT SUBTERRANEAN FORMATIONS WITH A CEMENT COMPOSITION

TECHNICAL FIELD

Hydraulic fracturing operations can be used to stimulate production of a reservoir fluid in a tight subterranean formation. A cement composition can be placed within the fractures to keep the fractures from closing. The cement composition can be designed to have a desired permeability after the cement has set. The reservoir fluid can then be produced through the fractures and the permeable cement.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION OF THE INVENTION

Figure 1:
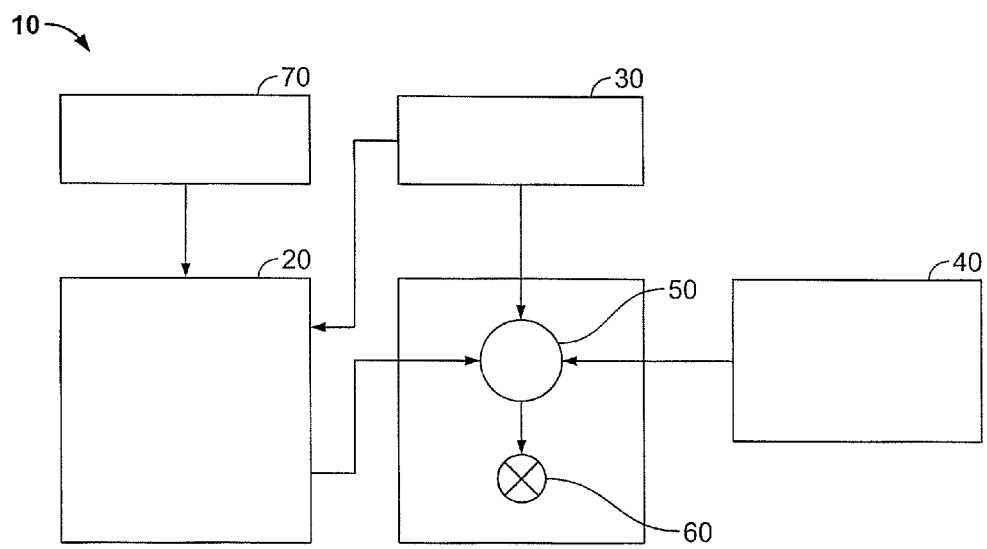
FIG. 1 is a diagram illustrating a fracturing system according to certain embodiments.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

As used herein, a "fluid" is a substance having a continuous phase that tends to flow and to conform to the outline of its container when the substance is tested at a temperature of 71° F. (22° C.) and a pressure of 1 atmosphere "atm" (0.1 megapascals "MPa"). A fluid can be a liquid or gas. A homogenous fluid has only one phase; whereas a heterogeneous fluid has more than one distinct phase. A heterogeneous fluid can be: a slurry, which includes an external liquid phase and undissolved solid particles as the internal phase; an emulsion, which includes an external liquid phase and at least one internal phase of immiscible liquid droplets; a foam, which includes an external liquid phase and a gas as the internal phase; or a mist, which includes an external gas phase and liquid droplets as the internal phase.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore. As used herein, "into a subterranean formation" means and includes into any portion of a subterranean formation including, into a well, wellbore, or the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

After a wellbore is drilled, it may often be necessary to fracture the subterranean formation to enhance hydrocarbon production. A fracturing fluid is pumped using a frac pump at a sufficiently high flow rate and high pressure into the wellbore and into the subterranean formation to create or enhance a fracture in the subterranean formation. Creating a fracture means making a new fracture in the formation. Enhancing a fracture means enlarging a pre-existing fracture in the formation. As used herein, the term "fracture" means the creation or enhancement of a natural fracture using a fracturing fluid and can be referred to as "man-made." To fracture a subterranean formation typically requires hundreds of thousands of gallons of fracturing fluid. Further, it is often desirable to fracture at more than one downhole location. Therefore, the base fluid of a fracturing fluid is usually water or water-based.

The newly-created or enhanced fracture will tend to close together after pumping of the fracturing fluid has stopped due to the weight of the subterranean formation. To prevent the fracture from closing, a material must be placed in the fracture to keep the fracture propped open. Generally, proppant is used to prop the fractures open. The proppant is in the form of solid particles, which can be suspended in the fracturing fluid, carried down hole, and deposited in the fracture as a "proppant pack." The proppant pack generally props the fracture in an open position while allowing fluid flow through the permeability of the pack.

However, the solid-liquid, multi-phase nature of a fracturing fluid containing proppant poses additional concerns and requires additional skills to properly perform the job. Moreover, production of a reservoir fluid can decline with proppant usage due to embedment of the proppant, which can reduce the permeability through the proppant pack, and proppant flowback. Consequently, hydraulic fracturing operations are some of the most complex operations performed in the Oil and Gas industry. Moreover, tight subterranean formations pose additional challenges for performing fracturing operations. As used herein, the terms "tight subterranean formation" and "tight formation" and the plural forms of the terms means a subterranean formation having at least one formation zone with a permeability of less than 1 millidarcy (mD). A "zone" is an interval of rock differentiated from surrounding rocks on the basis of its fossil content or other features, such as faults or fractures. For example, one zone can have a higher permeability compared to another zone. Permeability refers to the ability of a fluid to pass or flow through a particular material. The higher the permeability of the material, the easier it is for the fluid to flow through the material.

There exists a need and an ongoing industry-wide concern for improved fluids that can be used to prevent fractures from closing in tight formations. It has been discovered that a cement composition can be used to fracture a tight formation. The cement composition can flow into the fractures and set. One or more highly permeable flow paths can be created within the set cement to allow production of a reservoir fluid by inducing cyclic stresses or pressure pulses on the set cement composition.

Some of the advantages of using a cement composition to fracture a formation include the amount of water can be reduced compared to a traditional fracturing fluid, production levels can be increased by eliminating proppant embedment and/or flowback, cement is less expensive than proppant, and the horsepower requirement of the pumping equipment can be reduced.

As used herein, a "cement composition" is a mixture of at least cement and water that develops compressive strength or sets. A cement composition is generally a slurry in which the water is the external phase of the slurry and the cement (and any other insoluble particles) is the internal phase. The external phase of a cement composition can include dissolved solids. As used herein, the word "cement" means a binder, which is a dry substance that develops compressive strength and can set and can bind other materials together when mixed with water.

It is desirable for a cement composition to have certain properties, such as a desired rheology, thickening time, and compressive strength.

If any laboratory test (e.g., compressive strength) requires the step of mixing, then the cement composition is mixed according to the following procedure. The water is added to a mixing container and the container is then placed on a mixer base. The motor of the base is then turned on and maintained at 4,000 revolutions per minute "rpm" (+/−200 rpm). The cement and any other ingredients are added to the container. The ingredients and cement can be added at different times during the mixing. After all the ingredients have been added to the water in the container, a cover is then placed on the container, and the cement composition is mixed at 4,000 rpm (+/−200 rpm) for 1 min.

It is also to be understood that if any laboratory test requires the test be performed at a specified temperature and possibly a specified pressure, then the temperature and pressure of the cement composition is ramped up to the specified temperature and pressure after being mixed at ambient temperature and pressure. For example, the cement composition can be mixed at 71° F. (22° C.) and 1 atm (0.1 MPa) and then placed into the testing apparatus and the temperature of the cement composition can be ramped up to the specified temperature. As used herein, the rate of ramping up the temperature is in the range of about 3° F./min to about 5° F./min (about 1.67° C./min to about 2.78° C./min). The purpose of the specific rate of temperature ramping during measurement is to simulate the temperature profile experienced by the cement composition as it is being pumped downhole. After the cement composition is ramped up to the specified temperature and possibly specified pressure, the cement composition is maintained at that temperature and pressure for the duration of the testing.

It is necessary for a cement composition to remain pumpable during introduction into the well and until the cement composition is situated in the portion of the well to be cemented. After the cement composition has reached the portion of the well to be cemented, the cement composition ultimately sets. A cement composition that thickens too quickly while being pumped can damage pumping equipment or block tubing or pipes, and a cement composition that sets too slowly can cost time and money while waiting for the composition to set.

As used herein, the "thickening time" is how long it takes for a cement composition to become unpumpable at a specified temperature and pressure. The pumpability of a cement composition is related to the consistency of the cement composition. The consistency of a cement composition is measured in Bearden units of consistency (Bc), a dimensionless unit with no direct conversion factor to the more common units of viscosity. As used herein, a cement composition becomes "unpumpable" when the consistency of the substance reaches 70 Bc. As used herein, the consistency of a cement composition is measured according to ANSI/API 10B-2 section 9, Recommended Practice for Testing Well Cements, Second Edition, April 2013 as follows. The cement composition is mixed. The cement composition is then placed in the test cell of a High-Temperature, High-Pressure (HTHP) consistometer, such as a FANN® Model 275 or a Chandler Model 8240, at a specified temperature and pressure. Consistency measurements are taken continuously until the cement composition exceeds 70 Bc.

A cement composition can develop compressive strength. Cement composition compressive strengths can vary from 0 psi to over 10,000 psi (0 to over 69 MPa). Compressive strength is generally measured at a specified time after the cement composition has been mixed and at a specified temperature and pressure. Compressive strength can be measured, for example, at a time of 24 hours. According to ANSI/API 10B-2, Recommended Practice for Testing Well Cements, compressive strength can be measured by either a destructive method or non-destructive method and reported in units of pressure, such as psi or MPa.

The compressive strength of a cement composition can be used to indicate whether the cement composition has initially set or set. As used herein, a cement composition is considered "initially set" when the cement composition develops a compressive strength of 50 psi (0.3 MPa) using the non-destructive compressive strength method at a specified temperature and pressure. As used herein, the "initial setting time" is the difference in time between when the dry ingredients are added to the water and when the cement composition is initially set.

As used herein, the term "set," and all grammatical variations thereof, are intended to mean the process of becoming hard or solid by curing. As used herein, the "setting time" is the difference in time between when the dry ingredients are added to the water and when the cement composition has set at a specified temperature. It can take up to 48 hours or longer for a cement composition to set.

According to certain embodiments, a method of fracturing a tight subterranean formation comprises: introducing a cement composition comprising cement and water into the tight subterranean formation thereby creating or enhancing a fracture in the tight subterranean formation, wherein the tight subterranean formation comprises at least one formation zone with a permeability of less than 1 millidarcy; allowing the cement composition to set within the fracture; and creating a permeable flow path within the set cement composition using pressure pulses.

According to other embodiments, a method of fracturing a tight subterranean formation comprises: introducing a cement composition comprising cement and water into the tight subterranean formation thereby creating or enhancing a fracture in the tight subterranean formation, wherein the tight subterranean formation comprises at least one formation zone with a permeability of less than 1 millidarcy; allowing the cement composition to set within the fracture; and introducing a treatment fluid into the tight subterranean formation at or above the fracture gradient of the set cement composition to create or enhance a permeable flow path within the set cement composition.

It is to be understood that the discussion of preferred embodiments regarding the cement composition or any ingredient in the cement composition, is intended to apply to all of the method embodiments. Any reference to the unit "gallons" means U.S. gallons.

The method embodiments can further comprise the step of forming the cement composition prior to the step of introducing. According to this embodiment, the step of forming can comprise: adding at least the cement, the water, and any additional additives to a mixing apparatus; and mixing the cement composition. The step of forming can be performed by mixing the ingredients of the cement composition using a suitable mixing apparatus, such as a jet mixer, re-circulating mixer, or a batch mixer, for example, and then pumping the cement composition via pumping equipment to the wellbore. The fracturing system 10 of FIG. 1 can include a cement composition producing apparatus 20, a fluid source 30, a dry ingredient source 40, and a pump and blender system 50 and resides at the surface at a well site where a well 60 is located. The dry ingredient source 40 can include the cement and other solid additives for combining with the water of the cement composition. The system may also include an additive source 70 to alter the properties of the cement composition.

The pump and blender system 50 can receive the cement composition and combine it with other components, including ingredients from the dry ingredient source 40 and/or additive source 70. The resulting mixture may be pumped into the well 60 under a pressure sufficient to create or enhance one or more fractures in a tight subterranean zone, for example, to stimulate production of fluids from the zone. The cement composition producing apparatus 20, fluid source 30, dry ingredient source 40, and/or additive source 70 can each be equipped with one or more metering devices (not shown) to control the flow of fluids and ingredients to the pumping and blender system 50. Such metering devices can facilitate the pumping. The blender system 50 can source from one, some, or all of the different sources at a given time, and can facilitate the preparation of cement compositions using continuous mixing or "on-the-fly" methods. Thus, for example, the pumping and blender system 50 can provide just the cement composition into the well at some times, just other fluids at other times, and combinations of those components at yet other times.

Figure 2:
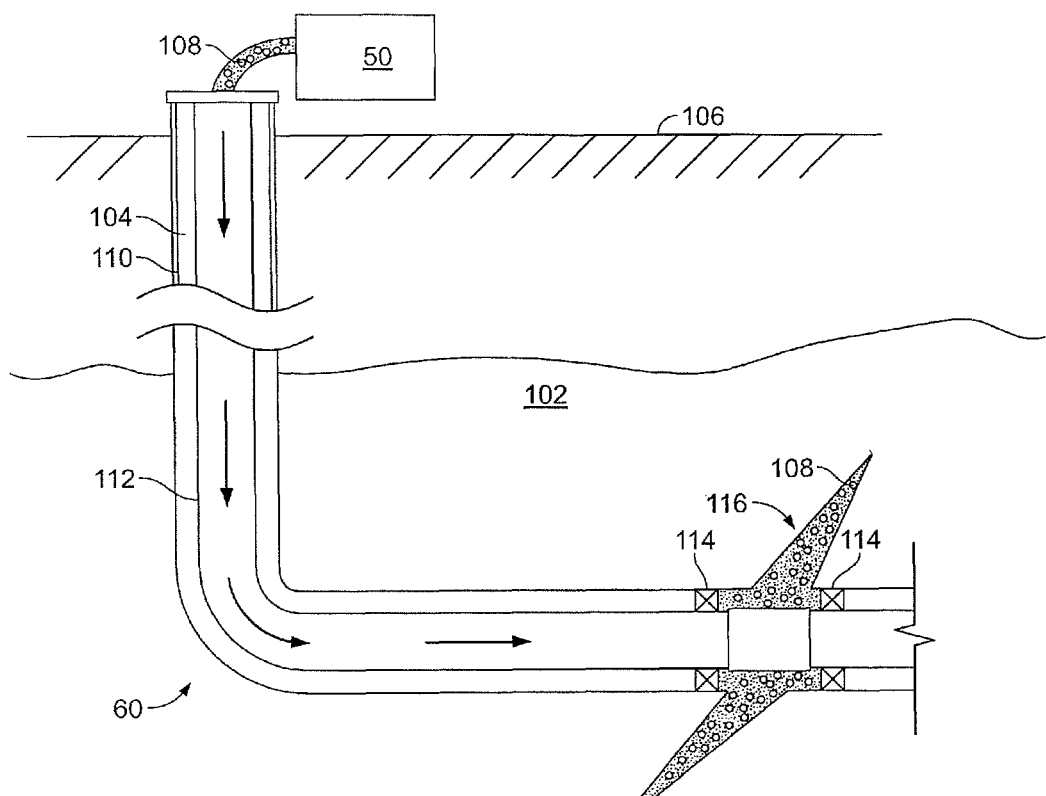
FIG. 2 is a diagram illustrating a well system in which a fracturing operation can be performed.

The cement composition can be pumped into the tight subterranean formation. FIG. 2 shows the well 60 during a fracturing operation in a portion of a subterranean formation 102. The subterranean formation can be penetrated by a well. The well can be, without limitation, an oil, gas, or water production well, an injection well, or a geothermal well. The well can also be an offshore well. The well includes a wellbore 104. The wellbore 104 extends from the surface 106, and the cement composition 108 is introduced into the tight subterranean formation 102. The cement composition can be introduced into the one or more tight formation zones. The tight subterranean formation can be a shale formation. The wellbore 104 can include a casing 110 that is cemented or otherwise secured to the wellbore wall. The wellbore 104 can be uncased or include uncased sections. Perforations can be formed in the casing 110 to allow the cement composition and/or other fluids to flow into the tight subterranean formation 102. In cased wells, perforations can be formed using shaped charges, a perforating gun, hydro-jetting and/or other tools.

The well is shown with a work string 112. The pump and blender system 50 can be coupled to the work string 112 to pump the cement composition 108 into the wellbore 104. The work string 112 can include coiled tubing, jointed pipe, and/or other structures that allow fluid to flow into the wellbore 104. The work string 112 can include flow control devices, bypass valves, ports, and/or other tools or well devices that control a flow of fluid from the interior of the work string 112 into the tight subterranean formation 102. For example, the work string 112 can include ports (not shown) located adjacent to the wellbore wall to communicate the cement composition 108 directly into the subterranean formation 102, and/or the work string 112 can include ports that are spaced apart from the wellbore wall to communicate the cement composition 108 into an annulus that is located between the outside of the work string 112 and the wall of the wellbore.

The well system can include one or more sets of packers 114 that create one or more wellbore intervals. The methods also include introducing the cement composition into the subterranean formation to create or enhance one or more fractures in the tight subterranean formation 102. When the fracturing fluid 108 is introduced into wellbore 104 (e.g., in FIG. 2, the wellbore interval located between the packers 114) at a sufficient hydraulic pressure, one or more fractures 116 may be created in the tight subterranean formation 102.

The cement composition includes cement. The cement can be Class A cement, Class C cement, Class G cement, Class H cement, and any combination thereof. The cement can be, without limitation, Portland cement, Gypsum cement, Joppa cement, Dyckerhoff cement, Slag cement, high aluminate cements, such as calcium-aluminate cements, calcium magnesia cements, and any combination thereof.

The cement composition includes water. The water can be selected from the group consisting of freshwater, brackish water, seawater, and saltwater, in any combination thereof in any proportion. The water can also include a water-soluble salt. The salt can be selected from the group consisting of sodium chloride, calcium chloride, calcium bromide, potassium chloride, potassium bromide, magnesium chloride, and any combination thereof in any proportion. The salt can be in a concentration in the range of about 0.1% to about 40% by weight of the water.

The cement composition can have a thickening time in the range of about 5 to about 15 hours, alternatively of about 10 to about 12 hours, at the bottomhole temperature and pressure of the subterranean formation. As used herein, the term "bottomhole" means the location within the subterranean formation where the cement composition is situated.

The cement composition can have a compressive strength greater than 1,000 psi (7 MPa), preferably greater than 2,000 psi (14 MPa), at the bottomhole temperature of the subterranean formation.

The cement composition can have an initial setting time of less than 48 hours, preferably less than 24 hours, at the bottomhole temperature of the subterranean formation. The cement composition can have a setting time of less than 48 hours, preferably less than 24 hours, at the bottomhole temperature of the subterranean formation.

The cement composition can further include other additives. Examples of other additives include, but are not limited to, proppant, a viscosifier or suspending agent, a filler, a lost-circulation material, a fluid loss additive, a strength enhancer, a friction reducer, a light-weight additive, a foaming agent, a defoaming agent, a high-density additive, a mechanical property enhancing additive, a filtration-control additive, a thixotropic additive, a set retarder, a set accelerator, and combinations thereof.

The cement composition can include a filler. Suitable examples of fillers include, but are not limited to, fly ash, sand, clays, and vitrified shale. Preferably, the filler is in a concentration in the range of about 5% to about 50% by weight of the cement (bwoc).

The cement composition can include a fluid loss additive. Suitable examples of commercially-available fluid loss additives include, but are not limited to, and are marketed by Halliburton Energy Services, Inc. under the tradenames HALAD®-344, HALAD®-413, and HALAD®-300. Preferably, the fluid loss additive is in a concentration in the range of about 0.05% to about 10% bwoc.

The cement composition can include a set retarder. Suitable examples of commercially-available set retarders include, but are not limited to, and are marketed by Halliburton Energy Services, Inc. under the tradenames HR®-4, HR®-5, HR®-6, HR®-12, HR®-20, HR®-25, SCR-100™, and SCR-500™. Preferably, the set retarder is in a concentration in the range of about 0.05% to about 10% bwoc.

The cement composition can include a friction reducer. Suitable examples of commercially-available friction reducers include, but are not limited to, and are marketed by Halliburton Energy Services, Inc. under the tradenames CFR-2™, CFR-3™, CFR-5LE™, CFR-6™, and CFR-8™. Preferably, the friction reducer is in a concentration in the range of about 0.1% to about 10% bwoc.

Commercially-available examples of other additives include, but are not limited to, and are marketed by Halliburton Energy Services, Inc. under the tradenames SPHER-ELITE® and LUBRA-BEADS® FINE, light-weight additives; HIGH DENSE® No. 3, HIGH DENSE® No. 4, BARITE™, and MICROMAX™, heavy-weight additives; SILICALITE™, extender and compressive-strength enhancer; and WELLLIFE® 665, WELLLIFE® 809, and WELLLIFE® 810 mechanical property enhancers.

The cement composition can include proppant. A treatment fluid including proppant can also be introduced between cement compositions or between the cement composition and another treatment fluid as a pill. As used herein, the term "proppant" means a multitude of solid, insoluble particles. The proppant can be naturally occurring, such as sand, or synthetic, such as a high-strength ceramic. Suitable proppant materials include, but are not limited to, sand (silica), walnut shells, sintered bauxite, glass beads, plastics, nylons, resins, other synthetic materials, and ceramic materials. Mixtures of different types of proppant can be used as well. The concentration of proppant in the cement composition or treatment fluid can be in the range of from about 0.01 kilograms to about 3 kilograms of proppant per liter of the base fluid (e.g., the water of the cement composition) (about 0.1 lb/gal to about 25 lb/gal). The size, sphericity, and strength of the proppant can be selected based on the actual subterranean formation conditions to be encountered during the fracturing operation.

According to certain embodiments, the cement composition can be a foamed or energized fluid. According to these embodiments, the cement composition is compressible (i.e., the ability to be deformed under a stress or pressure and return to its original position or volume after the stress or pressure is removed). A foamed or energized fluid can be used to increase the intensity of the pressure pulses.

The cement composition can include a foaming agent and a compressible gas. As used herein, a "foaming agent" is a material that facilitates formation of a foam. The foaming agent can be a surfactant. A surfactant is an amphiphilic molecule comprising a hydrophobic tail group and a hydrophilic head group. The surfactant can reduce the surface tension of a liquid, which reduces the amount of work needed to create the foam, or increases its colloidal stability by inhibiting coalescence of bubbles. The foaming agent can be selected from the group consisting of an anionic, non-ionic, or cationic surfactant, and combinations thereof. Commercially-available examples of a suitable foaming agent is HC-2™ agent, HY-CLEAN™ (HC-2) surface-active suspending agent, PEN-5™ surface-active agent, and AQF-2™ foaming agent, marketed by Halliburton Energy Services, Inc. Additional examples of foaming agents that may be used include, but are not limited to, betaines; amine oxides; methyl ester sulfonates; alkylamidobetaines, such as cocoamidopropyl betaine; alpha-olefin sulfonate; trimethyltallowammonium chloride; $C_8$-$C_{22}$ alkylethoxylate sulfates; trimethylcocoammonium chloride, and combinations thereof. Examples of suitable compressible gases include, but are not limited to, carbon dioxide and nitrogen gas.

The foaming agent can be in a concentration in the range of about 0.5% to about 25%, preferably about 0.5% to about 5% by volume of the water. The foaming agent can also be in at least a sufficient concentration such that a foam is created. The foaming agent can also be in a concentration such that at least a 10%, preferably at least a 40%, more preferably at least a 60%, quality of foam is created. As used herein, the phrase "quality of foam" means the percentage of the foamed fluid that is made up of the inert gas. By way of example, a 60% quality of foam means that the foam will have 60% by volume of the inert gas and 40% by volume of the water.

The cement composition can also be a shrinkable composition such that during and after setting, the cement composition permanently reduces in volume by greater than or equal to 5% creating a permeable flow path. By way of example, one or more cracks, ruptures, or splits can be created within the set cement composition from the shrinkable composition.

The methods also include allowing the cement composition to set within the fracture. The set cement can keep the fracture from closing under the pressure from the subterranean formation. According to certain embodiments, there is little to no leak off of the water of the cement composition into the formation and little to no flowback of the cement composition to the wellhead. As such, the cement composition remains within the fracture and sets within the fracture. Moreover, a lesser volume of fluid can be used because of the cement composition's ability to more easily remain in the fracture compared to a traditional fracturing fluid.

The methods include creating a permeable flow path within the set cement using pressure pulses. As used herein, the term "pressure pulses" and all grammatical variations thereof means deliberately varying the fluid pressure in the subterranean formation through the application of periodic increases and decreases, or "pulses," in the pressure of a fluid being injected into the subterranean formation. Pressure pulses can also be performed through the use of a pulse-generating apparatus attached to a wellhead located above the surface of the formation. Pulsing typically occurs either by raising and lowering a string of tubing located within the wellbore, or by employing a flutter valve assembly, which periodically opens and closes to permit a fluid to be pumped into the wellbore, or by using a fluid oscillator.

The pressure pulses create cyclical stresses to be imparted to the set cement composition. These cyclical stresses create the permeable flow path within the set cement composition. By way of example, one or more cracks, ruptures, or splits can be created within the set cement composition from the pressure pulses. These permeable flow path(s) can extend through the set cement composition, thereby permitting fluid flow through the set cement composition. In this manner, a reservoir fluid can be produced through the set cement composition located within the fracture. The length and intensity of the pressure pulses can vary and can be selected based on the desired properties of the set cement composition.

According to other embodiments, the methods include introducing a treatment fluid into the tight subterranean formation at or above the fracture gradient of the set cement composition. In this manner, after the cement has been placed into a fracture and allowed to set, a treatment fluid, such as a solid-free fluid, is injected at a high flow rate at or above the fracture gradient of the set cement composition to purposely generate a high stress load on the set cement, causing it to rupture or crack into fragments or chunks of solid masses. This high stress load can create or enhance at least a permeable flow path through the set cement composition within the propped fracture.

According to certain embodiments, the set cement composition has a desired amount of permeability. The desired amount of permeability can be predetermined based on the desired rate of fluid flow through the set cement composition and can be in the range of 0.01 to 2,000 darcies. One of ordinary skill in the art will be able to select the appropriate method of generating the pressure pulses, the length of pulsing, and the intensity of the pulses to create the desired amount of permeability in the set cement composition.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of fracturing a tight subterranean formation comprising:
   introducing a cement composition comprising cement and water into the tight subterranean formation thereby creating or enhancing a fracture in the tight subterranean formation, wherein the tight subterranean formation comprises at least one formation zone with a permeability of less than 1 millidarcy;
   then allowing the cement composition to set within the fracture; and
   then creating a permeable flow path within the set cement composition within the fracture using pressure pulses performed by varying the fluid pressure with periodic increases and decreases in the fluid pressure of a subsequently pumped treatment fluid injected into the subterranean formation, wherein the subsequent treatment fluid is not the cement composition.

2. The method according to claim 1, wherein the cement is selected from the group consisting of Class A cement, Class C cement, Class G cement, Class H cement, and any combination thereof.

3. The method according to claim 1, wherein the cement is selected from the group consisting of Portland cement, Gypsum cement, Joppa cement, Dyckerhoff cement, Slag cement, high aluminate cements, and any combination thereof.

4. The method according to claim 1, wherein the water is selected from the group consisting of freshwater, brackish water, seawater, and saltwater, in any combination thereof in any proportion.

5. The method according to claim 1, wherein the cement composition further comprises a water-soluble salt.

6. The method according to claim 1, further comprising forming the cement composition prior to the step of introducing, wherein the step of forming is performed by mixing the ingredients of the cement composition using a mixing apparatus.

7. The method according to claim 1, wherein the step of introducing comprises pumping the cement composition into the tight subterranean formation using a pump.

8. The method according to claim 1, wherein the cement composition has a thickening time in the range of about 5 to about 15 hours at the bottomhole temperature and pressure of the tight subterranean formation.

9. The method according to claim 1, wherein the cement composition has a compressive strength greater than 1,000 pounds force per square inch at the bottomhole temperature of the tight subterranean formation.

10. The method according to claim 1, wherein the cement composition has a setting time of less than 24 hours at the bottomhole temperature of the tight subterranean formation.

11. The method according to claim 1, wherein the cement composition further comprises other additives selected from the group consisting of a viscosifier or suspending agent, a filler, a lost-circulation material, a fluid loss additive, a strength enhancer, a friction reducer, a light-weight additive, a foaming agent, a defoaming agent, a high-density additive, a mechanical property enhancing additive, a filtration-control additive, a thixotropic additive, a set retarder, a set accelerator, and combinations thereof.

12. The method according to claim 1, wherein the cement composition further comprises proppant.

13. The method according to claim 1, wherein a treatment fluid comprising proppant is introduced into the tight subterranean formation as a pill between the cement composition or between the cement composition and a second treatment fluid.

14. The method according to claim 1, wherein the cement composition is compressible.

15. The method according to claim 14, wherein the cement composition further comprises a foaming agent and a compressible gas.

16. The method according to claim 1, wherein the cement composition is a shrinkable cement composition such that during and after setting, the cement composition permanently reduces in volume by greater than or equal to 5%.

17. The method according to claim 1, wherein the pressure pulses create one or more cracks, ruptures, or splits within the set cement composition.

18. The method according to claim 1, wherein the set cement composition has a desired amount of permeability due to the creation of the permeable flow path.

19. The method according to claim 18, wherein the desired amount of permeability is in the range of 0.01 to 2,000 darcies.

20. The method according to claim 18, wherein the method of generating the pressure pulses, the length of pulsing, and the intensity of the pulses are selected to create the desired amount of permeability.

21. The method according to claim 1, wherein the step of introducing uses one or more pumps.

22. A method of fracturing a tight subterranean formation comprising:
introducing a cement composition comprising cement and water into the tight subterranean formation thereby creating or enhancing a fracture in the tight subterranean formation, wherein the tight subterranean formation comprises at least one formation zone with a permeability of less than 1 millidarcy;
then allowing the cement composition to set within the fracture; and
then introducing a treatment fluid other than the cement composition into the tight subterranean formation at or above the fracture gradient of the set cement composition within the fracture to create or enhance at least a permeable flow path within the set cement composition within the fracture.

* * * * *